(12) United States Patent
Varadarajan et al.

(10) Patent No.: US 10,353,810 B2
(45) Date of Patent: Jul. 16, 2019

(54) SOFTWARE TESTING WITH MINIMIZED TEST SUITE

(71) Applicant: SAP SE, Walldorf (DE)

(72) Inventors: Anandh Varadarajan, Chennai (IN); Kushagra Jain, Raipur (IN); Rekha Kanakasabapathy, Erode (IN); Mohan Rajarathinam, Fremont, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/285,411

(22) Filed: Oct. 4, 2016

(65) Prior Publication Data

US 2018/0095867 A1 Apr. 5, 2018

(51) Int. Cl.
*G06F 9/44* (2018.01)
*G06F 11/36* (2006.01)

(52) U.S. Cl.
CPC .............................. *G06F 11/3688* (2013.01)

(58) Field of Classification Search
CPC .................................................. G06F 11/3688
USPC .................................................. 717/124–135
See application file for complete search history.

(56) References Cited

U.S. PATENT DOCUMENTS

| | | | | |
|---|---|---|---|---|
| 8,892,953 | B2* | 11/2014 | Frohlich | G06F 11/3688 714/25 |
| 9,405,663 | B2* | 8/2016 | Sivanesan | G06F 11/3684 |
| 2008/0172652 | A1* | 7/2008 | Davia | G06F 11/3684 717/124 |
| 2009/0070746 | A1* | 3/2009 | Dhurjati | G06F 11/3676 717/128 |
| 2014/0282411 | A1* | 9/2014 | Liemandt | G06F 11/3672 717/124 |
| 2015/0261657 | A1* | 9/2015 | Kommineni | G06F 11/3676 714/38.1 |
| 2016/0019135 | A1* | 1/2016 | Gotlieb | G06F 11/3684 717/124 |

OTHER PUBLICATIONS

Fraser et al., "Redundancy Based Test-Suite Reduction", 2007, Springer-Verlag Berlin Heidelberg 2007, pp. 291-305.*
Nadia R. T. Spido, "Method and Tool Support for Refinement of Test Suites", Jan. 2010, Master Thesis, Carleton University, Ottawa, ON, Canada, 162 pages.*

(Continued)

*Primary Examiner* — Ted T. Vo
(74) *Attorney, Agent, or Firm* — Mintz Levin Cohn Ferris Glovsky and Popeo, P.C.

(57) ABSTRACT

In one respect, there is provided a system that includes at least one processor and at least one memory. The memory may include program code that provides operations when executed by the at least one processor. The operations may include: identifying one or more functionalities of a software program that are invoked via a user interface; identifying a plurality of test cases for testing the one or more functionalities; generating a minimized test suite by at least eliminating, from the plurality of test cases, a redundant test case, wherein the redundant test case tests a same functionality as at least one other test case from the plurality of test cases; and testing, based at least on the minimized test suite, the software program. Related methods and articles of manufacture, including computer program products, are also provided.

14 Claims, 7 Drawing Sheets

(56) References Cited

OTHER PUBLICATIONS

Brooks et al., "Introducing a Test Suite Similarity Metric for Event Sequence-based Test Cases", 2009, IEEE, pp. 243-252.*

Panday et al., "Test Case Redundancy Detection and Removal Using Code Coverage Analysis", 2013, MIT International Journal of Computer Science & Information Technology vol. 3, No. 1, pp. 6-10.*

Graves, Todd L., et al. "An empirical study of regression test selection techniques." ACM Transactions on Software Engineering and Methodology (TOSEM) 10.2 (2001): 184-208.

Rana, P., et al., Exploratory Study for Regression Test Selection Techniques in Procedural and Object Oriented Programming Paradigm,: International Journal of Engineering and Computer Science, vol. 3, Issue 3, Mar. 2014.

* cited by examiner

```
Declare a arraylist<String> variable called functionList
Declare a arraylist<String> variable called reference
Declare a HashMap<String, List<String>> variable called testcaseFunctionMap
Declare a HashMap<String, List<String>> variable called functionCount
Declare a arraylist<String> variable called sortedTestCaseFunctionList
Declare a arraylist<String> variable called finalList
Declare a TreeMap<String, Integer> called sortedMap
Initialize a String variable called currentPointer to null
    Initialize a String variable called line to null
    Initialize a String variable called key to null
    Initialize a String variable called val to null
    Initialize a int variable called valueSize to 0
    Initialize a int variable called clear to 0
Initialize a int variable called reducedTestcaseCount to 0
Initialize a int variable called OriginalTestCount to 0
    READ the file which has the call hierarchy data
        While not EOF do:
        Read each line(L) from input file
            Set line to L
            IF line is Function
                IF clear IS 1
                    Initialize functionList and add L to list
                    Set Clear to 0
                ELSE
                    append L to functionList
                ENDIF
            ELSE
                IF testcaseFunctionMap has key L
                    Set reference to entry in testcaseFunctionMap with key L
                    Append functionList values to reference
                ELSE
                    Create new key L
                    Set functionList as value to key L in testcaseFunctionMap
                    Increment OriginalTestCount by 1
                ENDIF
                Set clear to 1
            ENDIF
        ENDWHILE
        FOR ALL ENTRIES in testcaseFunctionMap
            GET KEY K
            SET key to K
            GET number of values (N) for key K
            SET valueSize to N
            ADD entry <K,N> in functionCount
        ENDFOR
SORT functionCount IN descending order BASED ON N and SET sortedMap with sorted values
        FOR ALL ENTRIES in sortedMap
            GET KEY key
            GET values Val
            ADD key and val to sortedTestCaseFunctionList
        ENDFOR
        FOR ALL ENTRIES in sortedTestCaseFunctionList
            SET currentPointer to first entry
IF finalList NOT CONTAINS currentPointer AND last element of finalList and currentPointer is NOT TESTCASE
            ADD currentPointer to finalList
            ENDIF
        ENDFOR
        FOR ALL ENTRIES in finalList
            IF currentEntry NOT Function
                PRINT testcase
                INCREMENT reducedTestcaseCount by 1
            ENDIF
            PRINT OriginalTestCount AND reducedTestcaseCount
        ENDFOR
```

FIG. 6

SOFTWARE TESTING WITH MINIMIZED TEST SUITE

FIELD

The present disclosure generally relates to software testing and, more specifically, to the selection of test cases for regression testing.

BACKGROUND

Software maintenance may include modifying a software program to correct defects and/or improve performance, typically after the software program has been deployed into a production environment. A developer tasked with software maintenance may perform regression testing, which may refer to testing to ensure that modifications to the software program do not adversely affect any existing functionalities of the software program. Regression testing may rely on a test suite adapted for pre-deployment testing of the software program. As such, the test suite may include test cases covering every functionality of the software program. But performing regression testing by running the full test suite may consume an unnecessarily large amount of time and computing resources.

SUMMARY

Methods, systems, and articles of manufacture, including computer program products, are provided for software testing. In some implementations of the current subject matter, there is provided a system. The system may include at least one processor and at least one memory. The memory may include program code that provides operations when executed by the at least one processor. The operations may include: identifying one or more functionalities of a software program that are invoked via a user interface; identifying a plurality of test cases for testing the one or more functionalities; generating a minimized test suite by at least eliminating, from the plurality of test cases, a redundant test case, wherein the redundant test case tests a same functionality as at least one other test case from the plurality of test cases; and testing, based at least on the minimized test suite, the software program.

In some variations, one or more of the features disclosed herein including the following features can optionally be included in any feasible combination. The eliminating of the redundant test case may include: generating a sorted list of test cases, the sorted list of test cases including a plurality of test cases that are sorted based on a number of functionalities tested by each of the plurality of test cases; and removing one or more redundant functionalities by at least removing a functionality that is tested by a first test case from a second test case, the second test case being subsequent to the first test case in the sorted list of test cases. The minimized test suite may include one or more test cases that having at least one remaining functionality, when the one or more redundant functionalities have been removed.

In some variations, a page action may be generated. The page action may identify at least one input element from the user interface, and wherein the page action further identifies the one or more functionalities that are performed with respect to the at least one input element. The at least one input element may be a text box, a button, a radio button, dropdown menu, or a scrollbar. The one or more functionalities may include typing, selecting, clicking, and scrolling the at least one input element.

In some variations, the testing of the software program may include regression testing at least one modification to the one or more functionalities of the software program that are invoked via the user interface. The identifying of the plurality of test cases may include: generating a call hierarchy that provides a mapping from a functionality to one or more test cases testing the functionality; and determining, based at least on the call hierarchy, a mapping from a test case to the one or more functionalities tested by the test case.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6 depicts pseudocode for minimizing a test suite, in accordance with some example embodiments.

Figure 1:
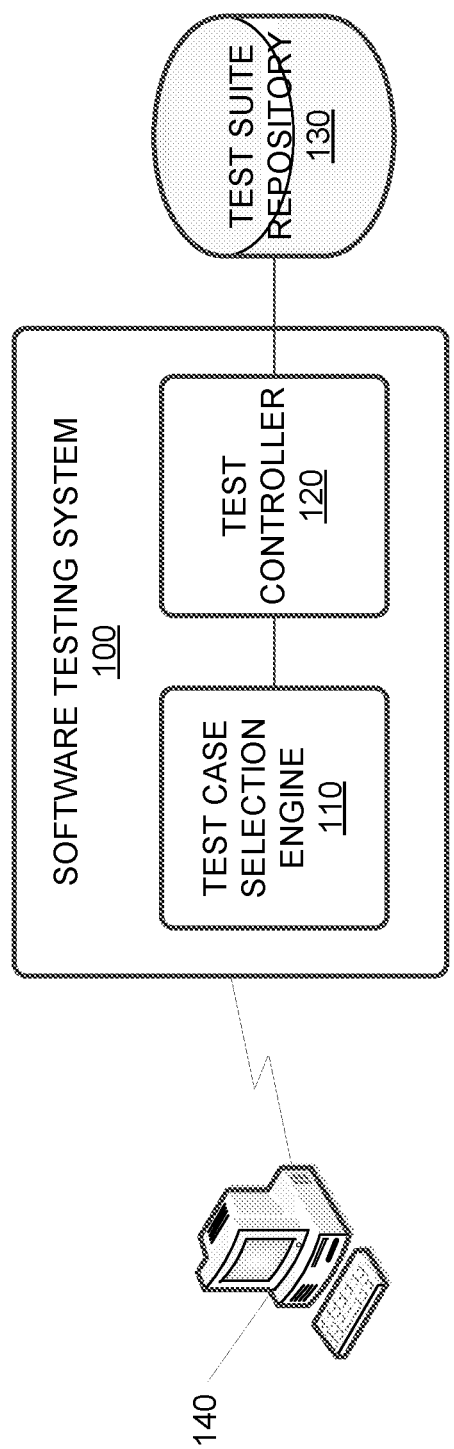
FIG. 1 depicts a network diagram illustrating a software testing system, in accordance with some example embodiments.

Like labels are used to refer to same or similar items in the drawings.

DETAILED DESCRIPTION

Regression testing a software program by running a full test suite may consume an unnecessarily large amount of both time and computing resources. For instance, a typical test suite may include approximately 2000 test cases and may require up to two full days to be run in its entirety. Running every test case from the test suite may include running redundant test cases that test the same functionalities repeatedly and/or irrelevant test cases that test functionalities unaffected by the modifications to the software program. However, regression testing with an indiscriminate selection of test cases may omit test cases that reveal crucial faults in the modified software program.

In some example embodiments, a test case selection engine may be configured to minimize a test suite used to test a software program. For example, modifications to the software program may include modifications to functionalities that are invoked via a user interface. Individual test cases can test one or more specific functionalities and/or series of functionalities provided via a user interface. For instance, a login page can be tested for text inputs (e.g., of username, password) and clicks on a login button.

The test case selection engine may minimize the test suite by at least identifying relevant test cases that test the functionalities that are invoked via the user interface. The test case selection engine may further eliminate redundant test cases that test functionalities already tested by one or more other test cases. According to some example embodiments, regression testing of the software program may be performed using a minimized test suite that covers every functionality that may be invoked via the user interface. The minimized test suite may include minimal redundancy such that the same functionality is not tested an excessive number of times.

In some example embodiments, the test case selection engine can be deployed for use in any testing setting and/or context. The test case selection engine may generate minimized test suites that may be optimal for a variety of testing purposes including, for example, browser certification for certifying whether a software product or application is proficient to run in different web browsers. The minimized test suites may include test cases directed toward specific features, which may support a continuous integration of software modifications. The availability of minimized test suites may alleviate the impact of sudden changes (e.g., to a user interface) including, for example, changes to accessibility and program code. The minimized test suites may be adapted to detect defects arising from modifications to, for example, the user interface. Application of minimized test suites instead of a full test suite may indirectly reduce the time required to analyze failures.

FIG. 1 depicts a network diagram illustrating a software testing system 100, in accordance with some example embodiments. Referring to FIG. 1, the software testing system 100 may include a test case selection engine 110 and a test controller 120. As shown in FIG. 1, the test controller 120 may be communicatively coupled to a test suite repository 130. Furthermore, the software testing system 100 (e.g., the test case selection engine 110) may communicate with a client device 140. For instance, the software testing system 100 may communicate with the client device 140 via a wired and/or wireless network (e.g., a wide area network (WAN), a local area network (LAN), and/or the Internet). Although the software testing system 100 is shown to as a remote and/or cloud platform, it should be appreciated that the software testing system 100 may also be deployed as computer software and/or dedicated circuitry (e.g., application specific integrated circuits (ASICs)) on the client device 140 without departing from the scope of the present disclosure.

In some example embodiments, a user may maintain a software program via the client device 140. As such, the user may provide, via the client device 140, one or more instructions and/or commands for modifying the software program. The user may further provide, via the client device 140, one or more instructions and/or commands to regression test the software program in order to identify faults that may have been introduced by the modifications. According to some example embodiments, the software testing system 100 may be configured to respond to the user's commands and/or instructions to regression test a software program by at least running a selective subset of the test cases in a corresponding test suite for the software program.

In some example embodiments, the test case selection engine 110 may be configured to minimize the test suite for regression testing the software program. The functionalities of the software program may be exposed via one or more user interfaces. Meanwhile, modifications to the software program may include modifications to functionalities that may be invoked via a particular user interface. As such, the test case selection engine 110 may generate a page action that identifies the functionalities that may be invoked via the user interface. The test case selection engine 110 may minimize the test suite by identifying relevant test cases from the test suite that tests these functionalities. According to some example embodiments, the test case selection engine 110 may further minimize the test suite by at least eliminating redundant test cases that test the same functionalities as other test cases in the test suite. For brevity and conciseness, examples in the present disclosure describe redundant test cases as test cases that test the same functionalities. But it should be appreciated that the same functionalities may refer to identical functionalities and/or substantially similar functionalities without departing from the scope of the present disclosure. Thus, two or more test cases may be redundant if the test cases test identical and/or substantially similar functionalities.

In some example embodiments, the test controller 120 may be configured to perform regression testing using the minimized test suite generated by the test case selection engine 110. Thus, the test controller 120 may test the software program by running a subset of test cases from the test suite that are relevant to the modifications made to the software program and that has minimal redundancy. For example, the test controller 120 may retrieve, from the test suite repository 130, test cases that are included in the minimized test suite generated by the test case selection engine 110. The test controller 120 may further run the test cases that are included in the minimized test suite. Results of the regression testing may be provided, via the client device 140, to the user.

Figure 2:
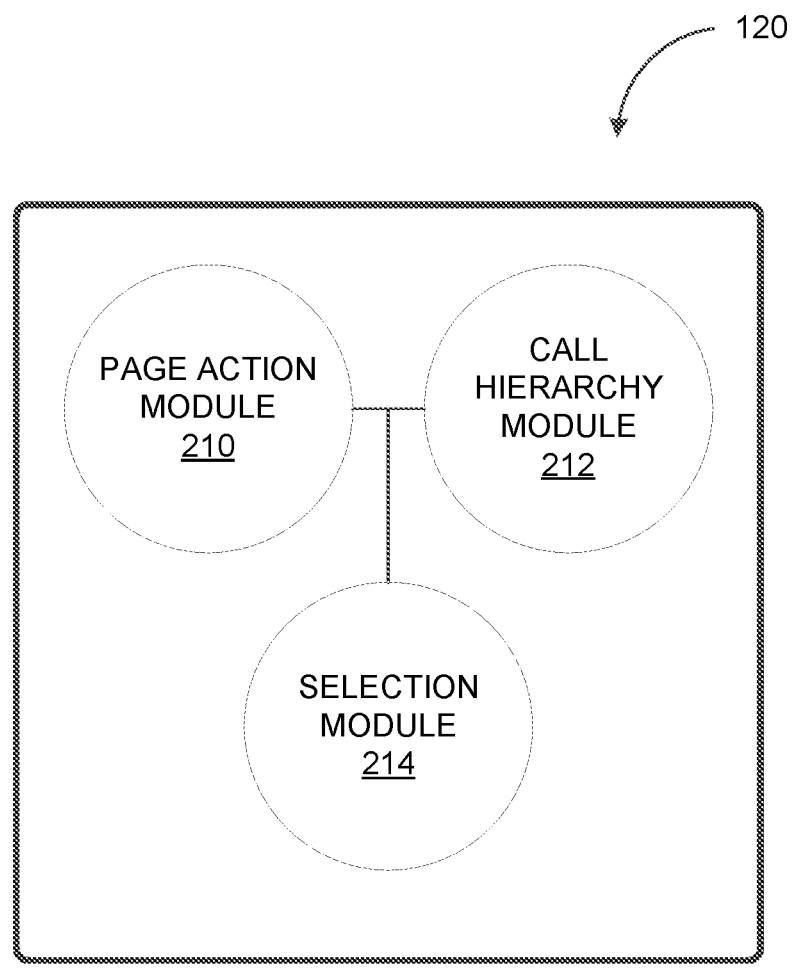
FIG. 2 depicts a block diagram illustrating a test case selection engine, in accordance with some example embodiments.

FIG. 2 depicts a block diagram illustrating the test case selection engine 110, in accordance with some example embodiments. Referring to FIGS. 1-2, the test case selection engine 110 may include a page action module 210, a call hierarchy module 212, and a selection module 214. It should be appreciated that the test case selection engine 110 may include additional and/or different modules without departing from the scope of the present disclosure.

In some example embodiments, the test case selection engine 110 may be configured to determine a minimized test suite for regression testing a software program. Modifications to the software program (e.g., made during software maintenance) may include modifications to the functionalities that are exposed via a particular user interface associated with the software program. As such, the page action module 210 may be configured to generate a page action for the user interface. The page action for the user interface may identify functionalities that may be invoked via that user interface. For example, the user interface may include one or more input elements (e.g., button, radio button, text box, dropdown menu, scroll bar). Furthermore, methods or operations (e.g., click, type, scroll, select) may be performed with respect to each of the one or more input elements. The functionalities that may be invoked via the user interface may correspond to the methods associated with each of the one or more input elements.

Figure 3:
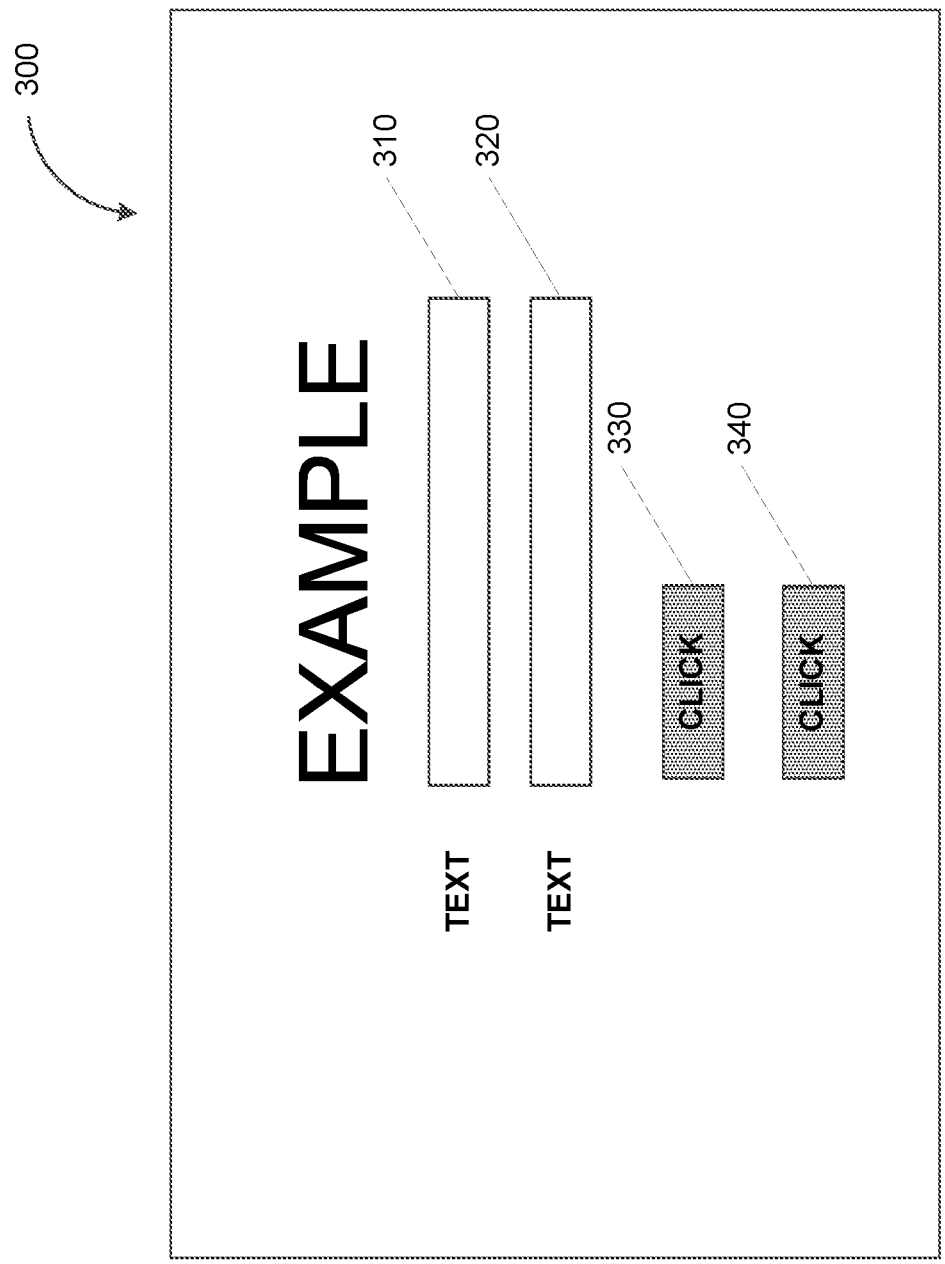
FIG. 3 depicts a user interface, in accordance with some example embodiments.

To further illustrate, FIG. 3 depicts a user interface 300, in accordance with some example embodiments. The user interface 300 may include a plurality of input elements including, for example, a first text box 310, a second text box 320, a first button 330, and a second button 340. In some example embodiments, the page action module 210 may generate a page action for the user interface 300. The page action for the user interface 300 may include the first text box 310, the second text box 320, the first button 330, and the fourth button 340. The page action for the user interface 300 may further include methods or operations that may be performed with respect to each of the first text box 310, the second text box 320, the first button 330, and the second button 340. For example, the page action for the user interface 300 may include four methods: M1, M2, M3, and M4. The first method M1 may be for typing in the first text box 310 while the second method M2 may be typing in the second text box 320. Meanwhile, the third method M3 may correspond to clicking on the first button 330 and the fourth method M4 may correspond to clicking on the second button 340.

In some example embodiments, the call hierarchy module 312 may be configured to identify test cases that tests at least one of the functionalities invoked via the user interface. Specifically, the call hierarchy module 312 may identify test cases based on the page action associated with the user interface. For instance, referring again to FIG. 3, the call hierarchy module 312 may be configured to identify test cases that tests one or more of the methods that may be performed with respect to the first text box 310, the second text box 320, the first button 330, and the second button 340. That is, the call hierarchy module 312 may identify one or more test cases that test the four methods M1, M2, M3, and M4. For example, the call hierarchy module 312 may identify the three test cases: T1, T2, and T3. In particular, the call hierarchy module 312 may determine a mapping from methods to test cases shown in Table 1 below. That is, the call hierarchy module 312 may determine that the first method M1 is tested by the first test case T1, the second test case T2, and the third test case T3. The call hierarchy module 312 may also determine that the second method M2 is tested by the first test case T1 and the second test case T2, the third method M3 is tested by the second test T2 and third test case T3, the fourth method M4 is tested by test case T3.

TABLE 1

M1 {T1, T2, T3}
M2 {T1, T2}
M3 {T2, T3}
M4 {T3}

The selection module 314 may be configured to select test cases to form a minimized test suite for regression testing the software program. In some example embodiments, the selection module 314 may be configured to eliminate redundant test cases that tests functionalities already tested by one or more other test cases. In doing so, the selection module 314 may generate a minimized test suite that covers, with the fewest possible number of test cases, every functionality that may be invoked via the user interface (e.g., typing in the first text box 310, typing in the second text box 320, clicking on the first button 330, and/or clicking on the second button 340).

Referring again to FIG. 3, the selection module 314 may identify which of the test cases T1, T2, and T3 are required to test the methods M1, M2, M3, and M4 associated with the user interface 300. As such, the selection module 314 may first determine, based on the mapping from methods to test cases (e.g., generated by the call hierarchy module 312), a mapping from test cases to methods. For instance, the selection module 314 may determine, based on the mapping from methods to test cases shown in Table 1, a mapping from test cases to methods. The selection module 314 may then sort, in descending order, the test cases T1, T2, and T3 based on number of methods covered by each test case. As such, the test cases that cover the most number of methods may be at the top of the sorted list while the test cases that cover the fewest number of methods may be at the bottom of the sorted list. In the foregoing example, the test cases T1, T2, and T3 may be sorted as shown in Table 2 below.

TABLE 2

T2 {M1, M2, M3}
T3 {M1, M3, M4}
T1 {M1, M2}

In some example embodiments, the selection module 314 may further process the sorted list of test cases by removing methods tested by one test case from all subsequent test cases in the sorted list. For instance, because the method M1 is already tested by the second test case T2, the selection module 314 may remove the method M1 from the first test case T1 and the third test case T3, which appear subsequent to the test case T2 in the sorted list of test cases shown in Table 2. Table 3 below shows the removal of the first method M1 from test cases that are subsequent to the test case T2 in the sorted list. Similarly, the second test case T2 also tests the second method M2 and the third method M3. As such, the selection module 314 may remove the second method M2 from the first test case T1 and the third method M3 from the third test case T3. The removal of the methods M2 and M3 from subsequent test cases are also shown below in Table 3.

TABLE 3

T2 {M1, M2, M3}
T3 {~~M1~~, ~~M3~~, M4}
T1 {~~M1~~, ~~M2~~ }

By removing methods tested by one test case from all subsequent test cases in the sorted list, the selection module 314 may generate a minimized test suite that tests every method M1, M2, M3, and M4 with minimal redundancy. In some example embodiments, the selection module 314 may be able to identify a single test case that tests every method associated with the user interface 300. Alternately or additionally, the selection module 314 may be required to identify additional test cases for any remaining methods that are not tested by earlier test cases in the sorted list.

In some example embodiments, the minimized test suite may include test cases that have one or more remaining methods after removal of methods that are tested by multiple test cases. For instance, as shown in Table 3, the selection module 314 may identify the second test case T2 for testing the first method M1, the second method M2, and the third method M3. Meanwhile, the selection module 314 may further identify the third test case T3 for testing the remaining fourth method M4. As such, for regression testing the software application, the selection module 314 may generate a minimized test suite that includes the second test case T2 and the third test case T3.

Figure 4:
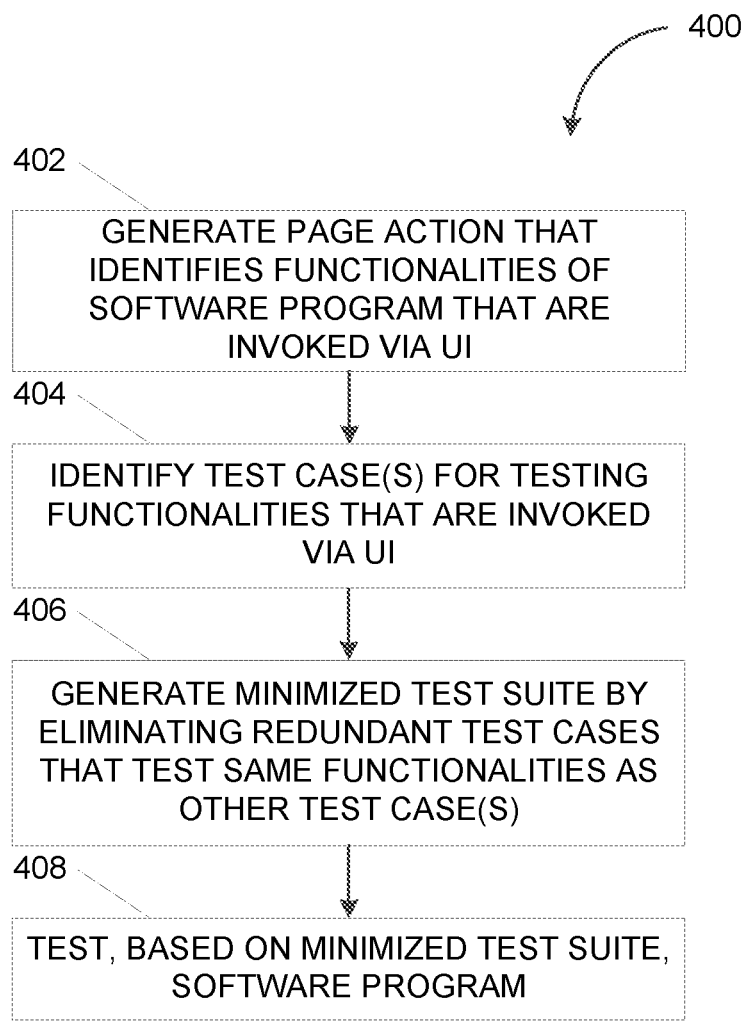
FIG. 4 depicts a flowchart illustrating a process for regression testing a software program, in accordance with some example embodiments.

FIG. 4 depicts a flowchart illustrating a process 400 for regression testing a software program, in accordance with some example embodiments. Referring to FIGS. 1-4, the process 400 may be performed by the software testing system 100.

In some example embodiments, the software testing system 100 may generate a page action that identifies a plurality of functionalities of a software program that are invoked via the user interface (402). For example, the software testing system 100 (e.g., the test case selection engine 110) may generate a page action for the user interface 300, which exposes at least some of the functionalities of a software program. The page action for the user interface 300 may identify a plurality of functionalities associated with the user interface. For instance, the page action for the user interface 300 may identify the first method M1 for typing in the first text box 310, the second method M2 for typing in the second text box 320, the third method M3 for clicking the first button 330, and the fourth method M4 for clicking the second button 340.

The software testing system 100 may identify a plurality of test cases for testing the plurality of functionalities that are invoked via the user interface (404). The software testing system 100 (e.g., the call hierarchy module 312) may first determine the test cases that tests each of the plurality of functionalities invoked via the user interface. For instance, the software testing system 100 (e.g., the call hierarchy module 312) may first generate the mapping from methods to test cases shown in Table 1. The software testing system 100 (e.g., the test case selection engine 110) may then generate, based on the mapping from methods to test cases (e.g., shown in Table 1), a mapping from test cases to methods. For instance, the software testing system 100 may identify the first test case T1 for testing the first method M1 and the second method M2. The software testing system 100 (e.g., the test case selection engine 110) may also identify the second test case T2 for testing the first method M1, the second method M2, and the third method M3. In addition, the software testing system 100 (e.g., the test case selection engine 110) may identify the third test case T3 for testing the first method M1, the second method M3, and the fourth method M4.

The software testing system 100 may generate a minimized test suite by at least eliminating redundant test cases that test the same functionalities as one or more other test cases (406). For instance, the software testing system 100 (e.g., the test case selection engine 110) may eliminate the first test case T1 because all the functionalities that are tested by the first test case T1 (e.g., the first method M1 and the second method M2) are already tested by the second test case T2 and the third test case T3. By contrast, the software testing system 100 (e.g., the test case selection engine 110) does not eliminate the third test case T3 because the third test case T3 tests the fourth method M4, which is not tested by any of the other test cases. Accordingly, the software testing system 100 (e.g., the test case selection engine 110) may generate a minimized test suite for the user interface 300 that includes the second test case T2 and the third test case T3. It should be appreciated that the minimized test suite for the user interface 300 is a comprehensive test suite for the user interface 300. That is, the minimized test suite includes test cases (e.g., the second test case T2, the third test case T3) that test all the functionalities of the user interface 300.

The software testing system 100 may test, based at least on the minimized test suite, the software program (408). For example, the user interface 300 may expose one or more functionalities of a software program that is undergoing maintenance. That is, modifications to the software program may include modifications to the functionalities invoked via the user interface 300. Thus, the software testing system 100 (e.g., the test controller 120) may test the computer program via the user interface 300 by running the second test case T2 and the third test case T3. Running the second test case T2 and the third test case T3 may test every functionality that can be invoked via the user interface 300. For example, running the second test case T2 may test the first method M1 for typing in the first text box 310, the second method M2 for typing in the second text box 320, and the third method M3 for clicking the first button 330. Meanwhile, running the third test case T3 may test the fourth method M4 for clicking the second button 340, which is not tested by the second test case T2.

Figure 5:
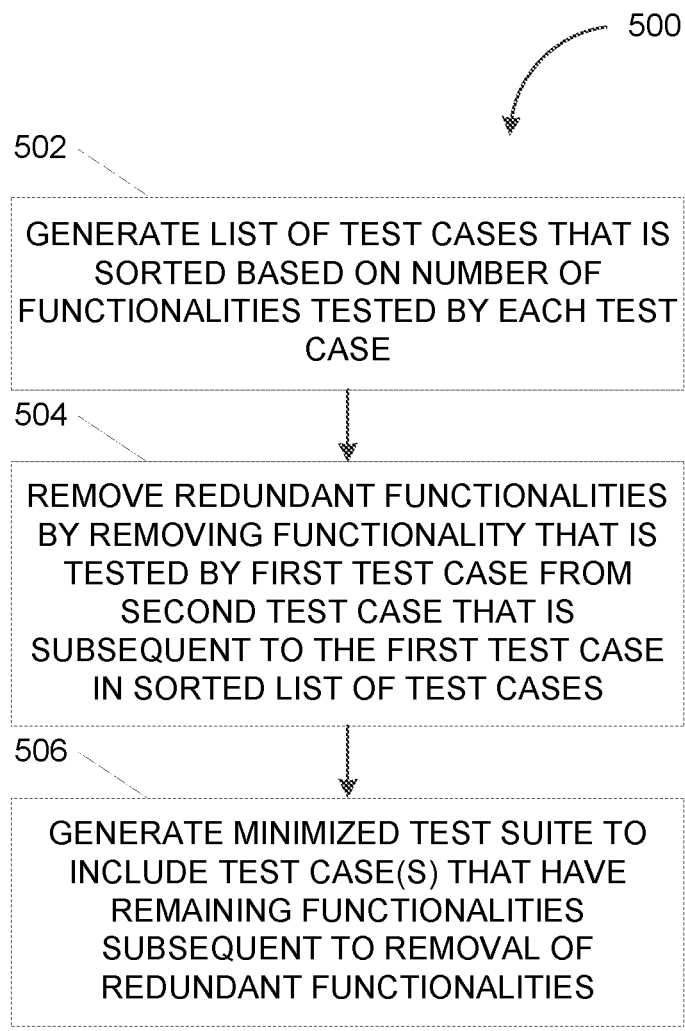
FIG. 5 depicts a flowchart illustrating a process for eliminating redundant test cases, in accordance with some example embodiments.

FIG. 5 depicts a flowchart illustrating a process 500 for eliminating redundant test cases, in accordance with some example embodiments. Referring to FIGS. 1-5, the process 500 may be performed by the software testing system 100 and may implement operation 406 of the process 400.

The software testing system 100 may generate a list of test cases that is sorted based on a number of functionalities tested by each test case (502). For example, the software testing system 100 (e.g., the test case selection engine 110) may sort the test cases T1, T2, and T3, which tests the functionalities of the user interface 300. The software testing system 100 may sort the test cases based on the number of functionalities tested by each test case. As such, sorting the test cases T1, T2, and T3 may generate the sorted list that is shown in Table 2 above.

The software testing system 100 may remove redundant functionalities by at least removing a functionality that is tested by a first test case from at least a second test case that is subsequent to the first test case in the sorted list of test cases (504). For example, the software testing system 100 (e.g., the test case selection engine 110) may remove, from the third test case T3, the first method M1 and the third method M3, which are both already tested by the second test case T2. Similarly, the software testing system 100 may remove, from the first test case T1, the first method M1 and the second method M2, which is tested by the second test case T2.

The software testing system 100 may generate a minimized test suite to include one or more test cases that have remaining functionalities subsequent to the removal redundant functionalities (506). For instance, after removing redundant methods from the first test case T1, the second test case T2, and the third test case T3, the second test case T2 and the third test case T3 still have methods remaining. As shown in Table 3 above, the second test case T2 may test the first method M1, the second method M2, and the third method M3. Meanwhile, the third test case T3 may test the fourth method M4. The first test case T1 may be excluded from the minimized test suite because the first test case T1 only tests methods (e.g., the first method M1 and the second method M2) that are already tested by other test cases.

FIG. 6 depicts pseudo-code for minimizing a test suite, in accordance with some example embodiments. Referring to FIGS. 1-6, the pseudo-code shown in FIG. 6 may be used to implement the process 400 and the process 500.

Figure 7:
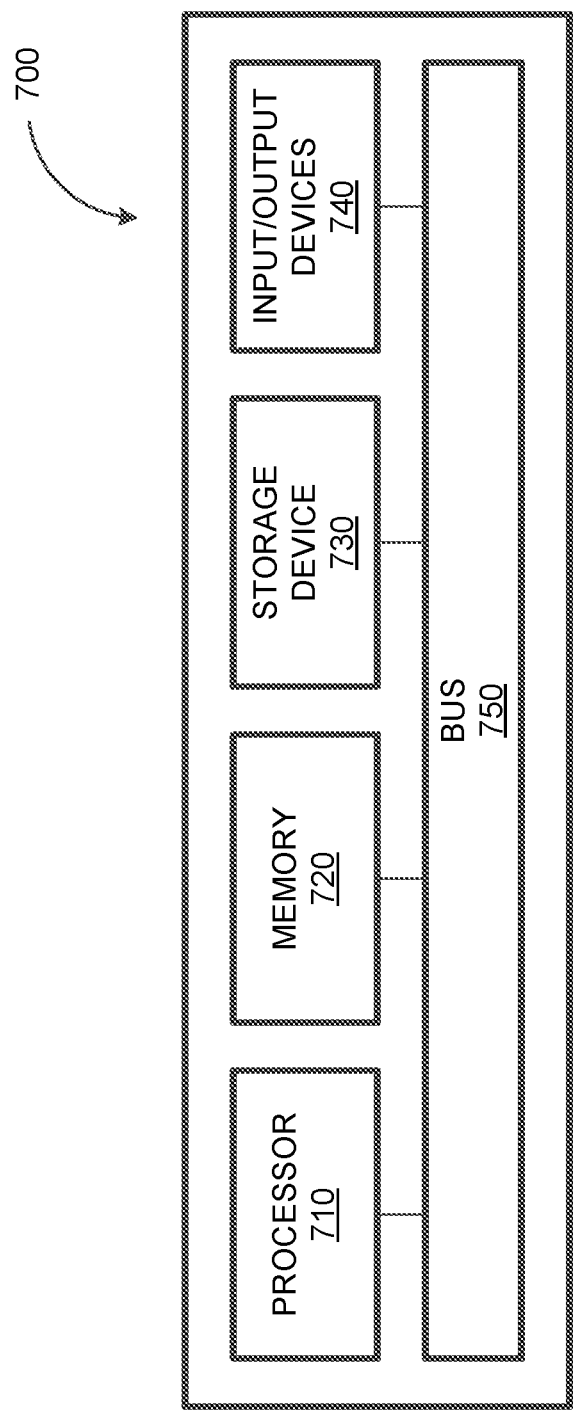
FIG. 7 depicts a block diagram illustrating a computing system, in accordance with some example embodiments.

FIG. 7 depicts a block diagram illustrating a computing system 700, in accordance with some example embodiments. Referring to FIGS. 1-6, the computing system 700 can be used to implement the software testing system 100.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the software testing system 100. In some implementations of the current subject matter, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some implementations of the current subject matter, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one processor; and
   at least one memory including program code which when executed by the at least one processor provides operations comprising:
      identifying one or more functionalities of a software program that are invoked via a user interface;
      identifying a plurality of test cases for testing the one or more functionalities;
      generating a minimized test suite by at least eliminating, from the plurality of test cases, a first test case that tests a same set of functionalities as a second test case and/or a third test case from the plurality of test cases, wherein the first test case is eliminated by at least:
         generating a sorted list of test cases that includes the plurality of test cases sorted based on a quantity of functionalities tested by each of the plurality of test cases, wherein the second test case and/or the third test case precede the first test case in the sorted list of test cases based at least on the second test case and/or the third test case testing a greater quantity of functionalities than the first test case; and
         eliminating the first test case based at least on a determination that each functionality tested by the first test case is also tested by the second test case and/or the third test case;
      testing, based at least on the minimized test suite, the software program.

2. The system of claim 1, further comprising:
   generating, based on the user interface, a page action, wherein the page action identifies at least one input element from the user interface, and wherein the page action further identifies the one or more functionalities that are performed with respect to the at least one input element.

3. The system of claim 2, wherein the at least one input element comprises a text box, a button, a radio button, dropdown menu, or a scrollbar.

4. The system of claim 2, wherein the one or more functionalities comprises typing, selecting, clicking, and scrolling the at least one input element.

5. The system of claim 1, wherein the testing of the software program comprises:
   regression testing at least one modification to the one or more functionalities of the software program that are invoked via the user interface.

6. The system of claim 1, wherein the identifying of the plurality of test cases comprises:
   generating a call hierarchy that provides a mapping from a functionality to one or more test cases testing the functionality; and
   determining, based at least on the call hierarchy, a mapping from a test case to the one or more functionalities tested by the test case.

7. A computer-implemented method, comprising:
   identifying, by at least one data processor, one or more functionalities of a software program that are invoked via a user interface;
   identifying, by the at least one data processor, a plurality of test cases for testing the one or more functionalities;
   generating a minimized test suite by at least eliminating, from the plurality of test cases, a first test case that tests a same set of functionalities as a second test case and/or a third test case from the plurality of test cases, wherein the first test case is eliminated by at least:
      generating a sorted list of test cases that includes the plurality of test cases sorted based on a quantity of functionalities tested by each of the plurality of test cases, wherein the second test case and/or the third test case precede the first test case in the sorted list of test cases based at least on the second test case and/or the third test case testing a greater quantity of functionalities than the first test case; and
      eliminating the first test case based at least on a determination that each functionality tested by the first test case is also tested by the second test case and/or the third test case;
   testing, based at least on the minimized test suite, the software program.

8. The method of claim 7, further comprising:
   generating, based on the user interface, a page action, wherein the page action identifies at least one input element from the user interface, and wherein the page action further identifies the one or more functionalities that are performed with respect to the at least one input element.

9. The method of claim 8, wherein the at least one input element comprises a text box, a button, a radio button, dropdown menu, or a scrollbar.

10. The method of claim 9, wherein the one or more functionalities comprises typing, selecting, clicking, and scrolling the at least one input element.

11. The method of claim 7, wherein the testing of the software program comprises:
    regression testing at least one modification to the one or more functionalities of the software program that are invoked via the user interface.

12. The method of claim 7, wherein the identifying of the plurality of test cases comprises:
    generating a call hierarchy that provides a mapping from a functionality to one or more test cases testing the functionality; and
    determining, based at least on the call hierarchy, a mapping from a test case to the one or more functionalities tested by the test case.

13. A computer program product comprising a non-transitory machine-readable medium storing instructions that, when executed by at least one programmable processor, cause the at least one programmable processor to perform operations comprising:
    identifying one or more functionalities of a software program that are invoked via a user interface;
    identifying a plurality of test cases for testing the one or more functionalities;
    generating a minimized test suite by at least eliminating, from the plurality of test cases, a first test case that tests a same set of functionalities as a second test case and/or a third test case from the plurality of test cases, wherein the first test case is eliminated by at least:
       generating a sorted list of test cases that includes the plurality of test cases sorted based on a quantity of functionalities tested by each of the plurality of test cases, wherein the second test case and/or the third test case precede the first test case in the sorted list of test cases based at least on the second test case and/or the third test case testing a greater quantity of functionalities than the first test case; and eliminating the first test case based at least on a determination that each functionality tested by the first test case is also tested by the second test case and/or the third test case testing, based at least on the minimized test suite, the software program.

14. The computer program product of claim 13, wherein the identifying of the plurality of test cases comprises:

generating a call hierarchy that provides a mapping from a functionality to one or more test cases testing the functionality; and determining, based at least on the call hierarchy, a mapping from a test case to the one or more functionalities tested by the test case.

* * * * *